United States Patent [19]

Inada et al.

[11] Patent Number: 5,443,747
[45] Date of Patent: Aug. 22, 1995

[54] CLEANING COMPOSITIONS

[75] Inventors: Minoru Inada, Yokohama; Kimiaki Kabuki, Tokyo; Yasutaka Imajo, Hachioji; Takayuki Oguni; Noriaki Yagi, both of Yokohama; Nobuhiro Saitoh, Ota; Akitsugu Kurita, Ota; Yoshiaki Takezawa, Ota, all of Japan

[73] Assignee: Kabushiki Kaisha Toshiba, Kawasaki, Japan

[21] Appl. No.: 651,370

[22] PCT Filed: Oct. 25, 1990

[86] PCT No.: PCt/JP90/01372

§ 371 Date: Feb. 28, 1991

§ 102(e) Date: Feb. 28, 1991

[87] PCT Pub. No.: WO91/06621

PCT Pub. Date: May 16, 1991

[30] Foreign Application Priority Data

| Oct. 26, 1989 [JP] | Japan | 1-280860 |
| Nov. 21, 1989 [JP] | Japan | 1-302580 |
| Mar. 16, 1990 [JP] | Japan | 2-065841 |
| Mar. 16, 1990 [JP] | Japan | 2-065842 |

[51] Int. Cl.⁶ .......................................... C11D 3/395
[52] U.S. Cl. ............................ 252/94; 252/174.15; 134/40; 134/42
[58] Field of Search ............... 252/174.15, 94; 134/40, 134/42

[56] References Cited

U.S. PATENT DOCUMENTS

| 3,193,499 | 7/1965 | Carr | 252/8.55 |
| 3,249,550 | 5/1966 | Metters | 252/161 |

(List continued on next page.)

FOREIGN PATENT DOCUMENTS 0160854 11/1985 European Pat. Off.
182583 5/1986 European Pat. Off.

(List continued on next page.)

OTHER PUBLICATIONS

*Handbook of Solvents*, Scheflan p. 165.
Kasprzak, Volatile Silicones New Cleaners for Oils and Greases, *Soap/Cosmetics/Chemical Specialties*, Dec. 1986, pp. 40–43.

*Primary Examiner*—Paul Lieberman
*Assistant Examiner*—Kery Fries
*Attorney, Agent, or Firm*—Foley & Lardner

[57] ABSTRACT

A cleaning composition comprising at least one low molecular weight polyorganosiloxane selected from the group consisting of straight chain polydiorganosiloxane represented by a general formula:

$$R^1-\underset{\underset{R^1}{|}}{\overset{\overset{R^1}{|}}{Si}}-O-\left(\underset{\underset{R^1}{|}}{\overset{\overset{R^1}{|}}{Si}}-O\right)_l-\underset{\underset{R^1}{|}}{\overset{\overset{R^1}{|}}{Si}}-R^1 \qquad (I)$$

(wherein $R^1$ is an organic group of single valence substituted by the same or different group or unsubstituted, and l is an integer from 0 to 5), and cyclic polydiorganosiloxane represented by a general formula:

$$\left(\underset{\underset{R^1}{|}}{\overset{\overset{R^1}{|}}{Si}}-O\right)_m \qquad (II)$$

(wherein $R^1$ is an organic group of single valence substituted by the same or different group or unsubstituted, and m is an integer from 3 to 7). To use it as a water system cleaning agent, polyoxyalkylene group containing polyorganosiloxane, a surfactant, and water are additionally mixed. Accordingly, a cleaning effect free from environmental destruction and contamination, equivalent to flon containing cleaning agents, and satisfactorily stable in terms of dispersion as a water system cleaning agent can be obtained. In addition, to use as a dewatering cleaning agent, the low molecular weight polyorganosiloxane is additionally mixed alone or with a surfactant and/or a hydrophilic solvent. Accordingly, cleaning and water substituting properties equivalent to flon containing dewatering cleaning agents and environmental safety can be obtained.

25 Claims, 1 Drawing Sheet

U.S. PATENT DOCUMENTS

| | | | |
|---|---|---|---|
| 3,498,922 | 3/1970 | Zisman | 252/171 |
| 3,904,430 | 9/1975 | Tipping et al. | 134/11 |
| 4,091,826 | 5/1978 | Bahrke | 134/11 |
| 4,166,305 | 9/1979 | Gustafsson et al. | 134/30 |
| 4,168,714 | 9/1979 | Bahrke | 134/60 |
| 4,169,807 | 10/1979 | Zuber | 134/30 |
| 4,247,330 | 1/1981 | Sanders, Jr. | 106/3 |
| 4,501,682 | 2/1985 | Goodman et al. | 252/174.15 |
| 4,677,278 | 6/1987 | Okada et al. | 528/34 |
| 4,685,930 | 8/1987 | Kasprzak | 8/139.1 |
| 4,708,807 | 11/1987 | Kamerer | 252/8.6 |
| 4,778,532 | 10/1988 | McConnell et al. | 134/30 |
| 4,784,799 | 11/1988 | Petroff | 252/545 |
| 4,960,533 | 10/1990 | Wisniewskie et al. | 252/174.15 |
| 4,985,155 | 1/1991 | Yamada et al. | 252/8.6 |
| 5,055,138 | 10/1991 | Slinn | 134/3 |
| 5,080,824 | 1/1992 | Bindle et al. | 134/40 |

FOREIGN PATENT DOCUMENTS

| | | | |
|---|---|---|---|
| 0183109 | 6/1986 | European Pat. Off. | |
| 0199288 | 10/1986 | European Pat. Off. | |
| 0351185 | 7/1989 | European Pat. Off. | |
| 0350316 | 1/1990 | European Pat. Off. | |
| 351185 | 1/1990 | European Pat. Off. | |
| 0381887 | 8/1990 | European Pat. Off. | |
| 0422787 | 4/1991 | European Pat. Off. | |
| 422787 | 4/1991 | European Pat. Off. | |
| 2418681 | 9/1979 | France | |
| 1753849 | 3/1976 | Germany | |
| 2541613 | 3/1977 | Germany | |
| 3321289 | 8/1983 | Germany | 252/174.15 |
| 3739711 | 6/1989 | Germany | |
| 61-231272 | 10/1961 | Japan | |
| 53-56203 | 5/1978 | Japan | 252/174.15 |
| 0132173 | 11/1978 | Japan | |
| 54-118404 | 9/1979 | Japan | 252/174.15 |
| 54-124010 | 9/1979 | Japan | 252/174.15 |
| 17160 | 4/1984 | Japan | |
| 59-39162 | 9/1984 | Japan | |
| 28880 | 7/1985 | Japan | |
| 62-273299 | 11/1987 | Japan | |
| 63-50463 | 10/1988 | Japan | |
| 63-884 | 12/1988 | Japan | |
| 1-239175 | 9/1989 | Japan | |
| 1-304032 | 12/1989 | Japan | |
| 2-91688 | 7/1990 | Japan | |
| 2-191581 | 7/1990 | Japan | |
| 2184302 | 7/1990 | Japan | |
| 3042002 | 2/1991 | Japan | |
| 2173508 | 10/1986 | United Kingdom | |
| 2188059 | 9/1987 | United Kingdom | |
| 2238793 | 6/1991 | United Kingdom | |
| 786920 | 12/1980 | U.S.S.R. | |
| WO89/11924 | 12/1989 | WIPO | |
| PCT/JA91/0-035 | 3/1991 | WIPO | |
| WO91/06621 | 5/1991 | WIPO | |

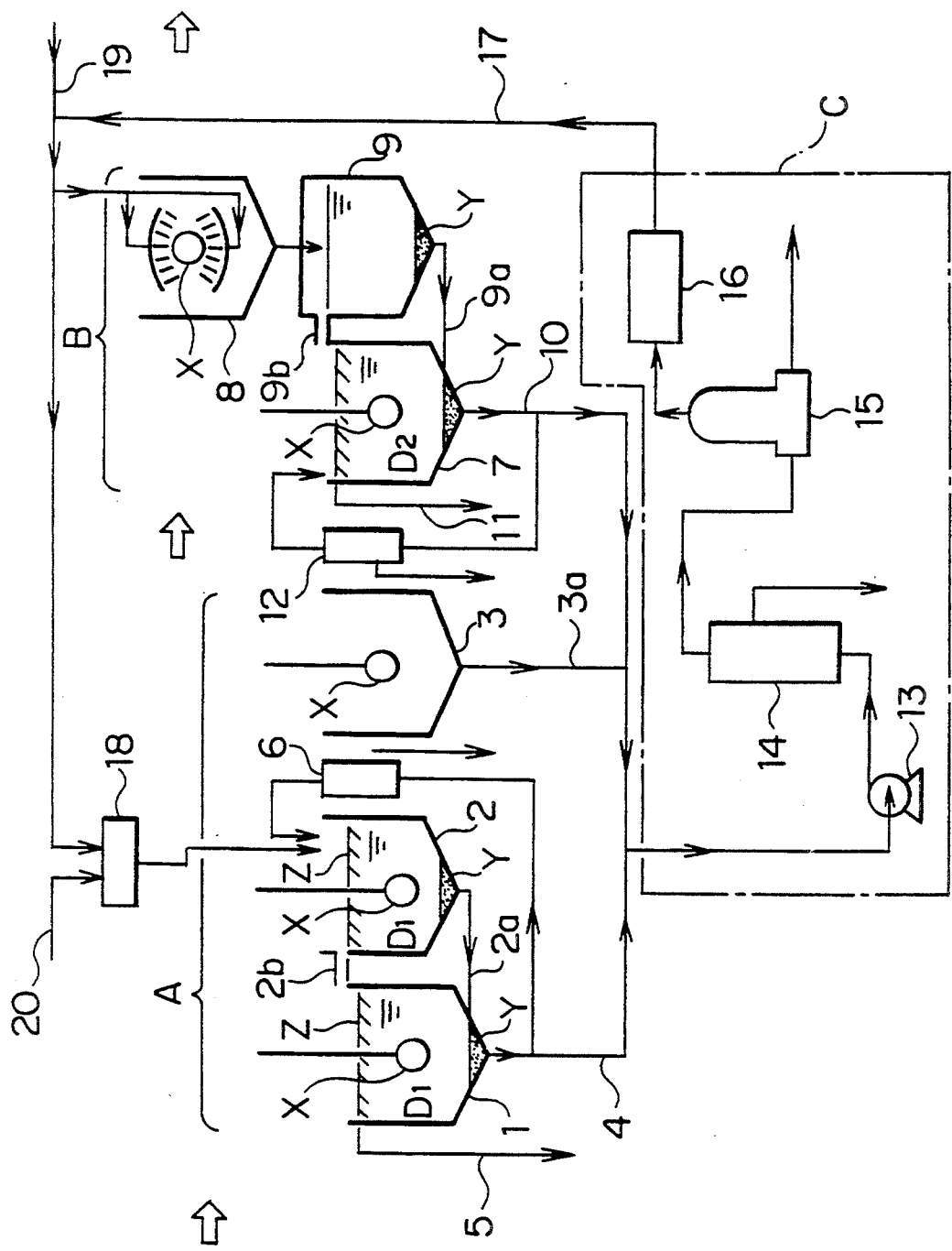

CLEANING COMPOSITIONS

BACKGROUND OF THE INVENTION

1. Field of the Invention

This invention relates to cleaning compositions which will replace cleaning agents containing an organic solvent including flon and the like.

2. Description of the Related Art

In manufacturing various parts such as metal parts, plated and coated parts, and electronic and semiconductor parts, flon containing solvents such as flon 113, and organic solvents such as trichloroethane, trichlorethylene, tetrachloroethylene, and carbon tetrachloride are widely used as cleaning agents for eliminating oil stains and the like.

The above organic solvent containing cleaning agents are also used as dewatering cleaning agents after having washed various parts with water in order to avoid the following problems that are associated with direct drying of water present on an object to be cleaned:

(1) Heating (100° C. or more) which entails energy loss;
(2) Reducing in productivity due to time taken in drying;
(3) Likely deformation of the object to be cleaned due to heating (thermal expansion that exceeds the tolerance); and
(4) Increase in space for installing a cleaning system including a cooler and a heat shielding unit.

The term "dewatering cleaning agent" is used herein to denote a cleaning agent into which an object to be cleaned, which has been washed with water, is immersed or with which the object is rinsed by shower thereby to have water present on the object substituted by itself and then vaporized by air at room temperature or heated to 60° C. or less so that the object can be dried.

However, ever since it has been found that the destruction of the ozone layer by discharge of flon affects seriously the human body and the ecological system, the use of flons such as flon 12 and flon 113 whose ozone destruction coefficients are high is on the gradual decline on a global scale for an eventual total ban.

Stricter regulations are imposed also on chlorine containing organic solvents such as trichloroethylene and tetrachloroethylene which are presumed to induce soil and underwater contaminations and the like.

Flons whose ozone destruction coefficients are lower than the currently used flon containing solvents are being developed, some of which are under fabrication on a commercial basis. However, these new developments are not so welcome because they still are destroyers of the ozone layer.

What gradually attracts attention as a replacement for the above organic solvents is a surfactant-based water system cleaning agent which is free from environmental destruction and contamination. However, cleaning agents containing only surfactants are not satisfactory in penetrability, thereby not cleaning, e.g., stains penetrated into narrow portions and medium to high viscous, persistently sticky oil stains.

Japanese Patent Publication No. 50463/1988 discloses a method of cleaning woven materials by using silicone containing compounds. According to the disclosure, a liquid cleaning composition containing an effective amount of cyclic siloxane having 4 to 6 silicon atoms is used. However, the liquid cleaning compositions including the above silicone containing compound are not suitable for use not only in general industrial products due to their being specifically prepared for woven materials, but also in systems using water (hereinafter referred to as "water system") due to their being based on a single cyclic siloxane or the mixture of a cyclic siloxane and an organic solvent. Further, such compositions are not so dispersive in water that the addition of a surfactant thereto does not assist in blending them homogeneously, thereby causing phase separation immediately. Thus, they are not adapted for use as water system cleaning agents.

On the other hand, Japanese Patent Laid Open No. 56203/1978 recites an aerosol aqueous cleaning composition containing a chain polydimethylsiloxane having 2 to 3 silicon atoms in a single molucular. Since its content is limited to about 0.02 to 0.1 wt. %, no such advantage as improving the cleaning property of water system cleaning compositions is disclosed.

Under such circumstances, the development of high-performance water system cleaning agents free from environmental problems is strongly called for.

In the meantime, the use of lower alcohols such as isopropyl alcohol is under study for a new development that can replace the above-mentioned organic solvents for dewatering. However, isopropyl alcohol has a flash point of 11.7° C., which is lower than room temperature, and this involves some danger of fires under ordinary handling conditions. In addition, isopropyl alcohol is highly compatible with water, so that the initial dewatering property is ensured, but its repetitive use causes dissolved water to be present again. As a result its dewatering property will be impaired on a long-term basis. To refine isopropyl alcohol for reuse by removing water from the water containing isopropyl alcohol, a tremendous equipment investment is required. That isopropyl alcohol is toxin to the human body is another factor that tends to keep it from using.

The use of hydrocarbon and higher alcohols which have higher flash points than room temperature allows a comparatively easy removal of water, but their low volatility prevents drying themselves at low temperatures, e.g., 60° C. or less, thereby making them unsuitable for applications to dewatering cleaning agents.

Therefore, an object of the invention is to provide water system cleaning compositions which have cleaning capability equivalent to that of organic solvent containing cleaning agents including such as flon and which are stable as water system cleaning agents and free from environmental destruction and contamination.

Another object of the invention is to provide dewatering compositions which have the substituting and drying properties equivalent to those of organic solvent containing dewatering cleaning agents, which have few risks of fires and which are free from environmental destruction.

SUMMARY OF THE INVENTION

A cleaning agent composition of the invention comprises at least one low molecular weight polyorganosiloxane selected from the group consisting of straight chain polydiorganosiloxane represented by a general formula:

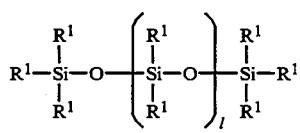

(I)

(wherein $R^1$ is an organic group of single valence substituted by the same or different group or unsubstituted, and l is an integer from 0 to 5), and cyclic polydiorganosiloxane represented by a general formula:

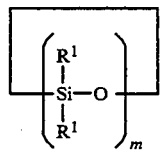

(II)

(wherein $R^1$ is an organic group of single valence substituted by the same of different group of unsubstituted, and m is an integer from 3 to 7).

Each of such low molecular weight polyorganosiloxanes exhibits powerful penetrability to stains and satisfactory substituting property with water alone, making itself a feature component of the invention. Reference character $R^1$ in formulas (I) and (II) denotes a substituted or unsubstituted organic group of single valence including: a single-valence unsubstituted hydrocarbon group such as an alkyl group such as a methyl group, an ethyl group, a propyl group, and a butyl group and a phenyl group; and a single-valence substituted hydrocarbon group such as a trifluoromethyl group. As the $R^1$ which is placed at an end of formula (I), an amino group, an amide group, an acrylic acid ester group, and a mercaptan group are typical organic groups; however, the methyl group is most preferable from the viewpoint of stability, and maintainability of volatility, and the like.

The cleaning compositions of the invention may roughly be classified into two groups: a water system cleaning agent and a dewatering cleaning agent.

For use as a water system cleaning agent, suitable low molecular weight polyorganosiloxanes include: octamethylcyclotetrasiloxane, decamethylcyclopentasiloxane and mixtures thereof, each having a cyclic structure; and octamethyltrisiloxane and decamethyltetrasiloxane, each having a straight chain structure, from the viewpoint of penetrability and cleaning capability. In regions where the water system cleaning composition has a strong alkaline property from the viewpoint of stability of polysiloxane, the low molecular weight polyorganosiloxane having a straight chain structure which is represented by formula (I) is preferable.

For use as a dewatering cleaning agent, low molecular weight polyorganosiloxanes having a cyclic structure are preferable from the viewpoint of substituting property with water and penetrability and the like, octamethylcyclotetrasiloxane, decamethylcyclopentasiloxane, and mixtures thereof are more preferable.

A case in which the cleaning compositions of the invention are used as water system cleaning agents will now be described.

Although the low molecular weight polyorganosiloxanes represented by formulas (I) and (II) exhibit powerful penetrability to stains, each composition is not compatible with water singly nor is it soluble and stably dispersive in water so that it is likely to have phase separation in water. That is, it is proposed to use them in combination with polyoxyalkylene group containing polyorganosiloxane having in a single molecule at least one siloxy unit represented by a general formula:

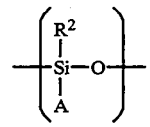

(III)

(wherein $R^2$ is an alkyl or phenyl group and A is a polyoxyalkylene group). As a result of such use in combination, the low molecular weight polyorganosiloxanes, providing stable dispersion in water, exhibit strong penetrability to stains. In addition, the use of a surfactant in combination with the compositions may improve their cleaning property.

Thus, preferable compositions for a water system cleaning agent of the invention contain the low molecular weight polyorganosiloxane represented by formula (I) or (II); the polyoxyalkylene group containing polyorganosiloxane having at least one siloxy unit represented by formula (III) in a single molecular; a surfactant; and water.

The polyoxyalkylene group containing polyorganosiloxane exhibits affinity for water owing to its polyoxyalkylene group bonded with the silicon atom, thus not only being a component for a stable water system dispersed solution or aqueous solution but also acting as an agent for eliminating stains by penetrating into the interface between the stains and a substrate which is made of, e.g., a metal and which has the stains deposited thereon, and as an antifoaming agent as well.

Such a polyoxyalkylene group containing polyorganosiloxane can be prepared by hydrosilyl group containing polyorganosiloxane and a polyoxyalkylene compound having an unsaturated group at the end to interact with each other for addition under the presence of a platinum containing catalyzer.

An example of the polyoxyalkylene group denoted by reference character A in formula (III) is, e.g., a single-valence group represented by the formula:

(IV)

(wherein $R^3$ is a two-valance group selected from the group consisting of an alkylene group having from 1 to 8 carbon atoms, a β-hydroxypropyleneoxyalkylene group and a polymethylene oxyalkyelene group, both having from 4 to 11 carbon atoms; $R^4$ is an alkylene group having from 2 to 4 carbon atoms; $R^5$ is an end group selected from a hydrogen atom and a single-valence organic group; and n is a positive integer).

Siloxane that forms a main component of the polyoxyalkylene group containing polyorganosiloxane is not particularly limited. The organic group that is to be bonded with the silicon atom of the siloxane is basically a methyl group, but may also contain a single-valence hydrocarbon group such as an ethyl group, a propyl group, a butyl group, a phenyl group, or a single-valence substituted hydrocarbon group such as a trifluoromethyl group as long as the advantages of the invention can remain harmless therefrom.

Also, the molecular weight of the siloxane is not particularly limited nor is that of a single polyoxyalkylene group. Although they are large values, the addition of a surfactant thereto and the like allows the composition to be made sufficiently water soluble or stably water dispersive. However, it is practically preferable to limit the molecular weight of the single polyoxyalkylene group in the order of 100 to 5000. For a polyoxyalkylene chain, it is preferable to adjust its oxyethylene component to 40 mol % or more in the total polyoxyalkylene.

While the amount of the polyoxyalkylene group is not particularly limited, it is more preferable to limit it within 5 mol % or more of the total organic groups bonded with silicon atoms of the polyorganosiloxane from the standpoint of system stability.

Exemplary polyoxyalkylene group containing polyorganosiloxanes include:

a chain polysiloxane represented by the formula:

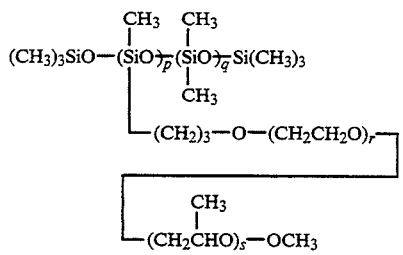

(wherein p, q, r, and s are positive integers); and a cyclic polysiloxane represented by the formula:

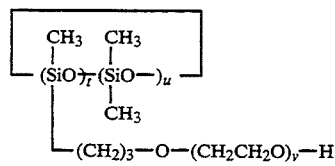

(wherein t, u, and v are positive integers).

The surfactant serves as a component for dissolving, emulsifying, and stabilizing the stains removed by the low molecular weight polyorganosiloxanes or polyoxyalkylene group containing polyorganosiloxanes.

Such surfactants can be classified by the activation chemical structure into the following types: cationic, anionic, nonionic, amphoteric, and combined types. The invention may be applied to all the above types of surfactants. However, to obtain the advantage from their combination with the polyoxyalkylene group containing polyorganosiloxane, it is preferable to use anionic, nonionic, or amphoteric surfactants. Particularly, the use of the polyoxyalkylene group containing polyorganosiloxane in combination with either anionic/nonionic surfactants or amphoteric/nonionic surfactants provides a remarkable synergetic effect in improving the cleaning property and penetrability of the low molecular weight polyorganosiloxanes or the polyoxyalkylene group containing polyorganosiloxanes.

Exemplary suitable surfactants to be applied to the invention include: anionic surfactants such as polyoxyalkylene alkylether sulfonates and phosphoric esters; nonionic surfactants such as polyalcohol fatty acid esters, polyoxyalkylene fatty acid esters, and polyoxyalkylene alkylethers; amphoteric surfactants such as imidazolin derivatives; and cationic surfactants such as alkylamine salts, alkyl quaternary ammonium salts. In addition thereto, terpene containing compounds which are rarely present in the form of a single substance and extracted from natural substances as well as higher fatty acid esters may also be applied. It is also possible to use synthetic compounds in which part of the chemical structure of each compound is substituted by a fluorine or silicon atom.

While the composition ratio of the above-mentioned quaternary water system cleaning agent is not particularly limited, it is preferable to blend 10 to 1000 parts by weight of a surfactant to 100 parts by weight of the polyoxyalkylene group containing polyorganosiloxane, and 1000 parts by weight or less of the low molecular weight polyorganosiloxane to 100 parts by weight of a total combination of the above surfactant(s) and the polyoxyalkylene containing polyorganosiloxane. Too small an amount of the surfactant reduces the cleaning capability, while too large an amount impairs the penetratbility. Too large an amount of the low molecular weight polyorganosiloxane not only makes the system difficult to disperse but also reduces stability as a water system composition. A preferable fraction of the surfactant is 30 to 700 parts by weight, or, more preferably, 50 to 300 parts by weight, to 100 parts by weight of the polyoxyalkylene group containing polyorganosiloxane. A more preferable fraction of the low molecular weight polyorganosiloxane is between 10 and 1000 part by weight. While the fraction of water in the quaternary water system cleaning agent is not particularly limited either, it is preferable to have water 40 wt. % or more or, more preferably, 70 to 99.5 wt. % to the total composition from a stability viewpoint.

By the way, the polyoxyalkylene group containing polyorganosiloxane having in a single molecule at least one siloxy unit represented by formula (III) penetrates, as described above, into the interface between the stains and the substrate made of, e.g., a metal to which the stains adhere to "peel off" the stains. Thus, even a tertiary composition consisting of the polyoxyalkylene group containing polyorganosiloxane, a surfactant, and water may serve as a viable water system cleaning agent. In this case, the fractions of the quaternary water system cleaning agent will apply to the tertiary composition.

The fractions of the tertiary or quaternary water system cleaning agents may be so designed that the value to be obtained by a canvas method at room temperature for evaluating penetrability will be 15 or less, 10 or less, or 5 or less. For the evaluation, the canvas method specified as a fiber/textile test method by Japanese Industrial Standards (JIS) is adopted. Since the cleaning property of these water system cleaning agents depends on the pH value of the solution itself, it is desirable to adjust the pH value to the alkali region. The pH value is more preferably be between 8 to 14.

The tertiary or quaternary cleaning agents can be prepared easily by blending and stirring the above-mentioned polyoxyalkylene group containing polyorganosiloxane, a surfactant, water, or further the low molecular weight polyorganosiloxane represented by formula (I) or (II), where necessary. The use of a known dispersing device will help obtain a water system cleaning agent with ease.

The water system cleaning agents such as described above may have additives to be applied to ordinary water-soluble cleaning agents such as pH modifiers, adsorbents, solid particles, synthetic builders, rust preventives, and antistatic agents mixed as cleaning assistants or post-cleaning added-value improving agents and the like, depending on the property, amount, adhering state, cleaning condition, and the like of a stain. Such an addition may play an important part depending on their application.

The water system cleaning agents of the invention may be applied to metals, ceramics, plastics, and the like. More specifically, they may be applied to metallic parts, surface treated parts, electronic and semiconductor parts, electric and precision machinery parts, optical parts, glass and ceramic parts, and the like. An exemplary general-purpose cleaning process usually involves cleaning of any of the above-described parts by such a process as ultrasonic process, mechanical stirring and spraying, and thereafter, washing by water (preferably by pure water or ion-exchanged water), and is dewatered by drying the part with heated air or a like process. The cleaning composition in which the stain separated from the part is present is treated by, e.g., separating the stain through a filter or the like and thereafter by being subjected to a general waste water treatment process, thereby allowing the composition to be unhazardous and pollution-free easily.

According to the water system cleaning agent of the invention, the powerful penetrating property of the low molecular weight polyorganosiloxane represented by formula (I) or (II) for the interface between the stains and the substrate as well as the cleaning capability of the surfactant(s) to the stains provides a cleaning performance equivalent to that of the conventionally used flon containing cleaning agents. The use of the polyoxyalkylene group containing polyorganosiloxane in combination with the water system cleaning agents of the invention allows satisfactory dispersing property in water. In addition, when applied as a tertiary composition consisting of the polyoxyalkylene group containing polyorganosiloxane, the surfactant, and water, the cleaning agent of the invention exhibits excellent cleaning property by the penetrating capability of the polyoxyalkylene group containing polyorganosiloxane with respect to the stain. Being a water system agent, it will bring no risk of environmental destruction and pollution. Thus, it can be said from the above that the water system cleaning agent of the invention can be an attractive replacement for cleaning agents based on organic solvents containing flon and other substances which have considered hazardous.

A case in which a cleaning composition of the invention is used as a dewatering cleaning agent will now be described.

Here, the term "dewatering agent" is only so named after "water," which is a typical liquid capable of being substituted by the low molecular weight polyorganosiloxanes, and the cleaning compositions of the invention may also be used as "liquid removing" agents in substituting and cleaning liquids other than water. The applicable liquids may be those which are insoluble or difficult to be dissolved in the low molecular weight polyorganosiloxanes and whose surface tensions are larger than those of the low molecular weight polyorganosiloxanes. The "water" to be cleaned may include liquids using water as a dispersion medium such as mixtures of water and alcohols and liquids in which various substances are dissolved.

The low molecular weight polyorganosiloxane represented by formula (I) or (II) can be, as described previously, substituted by water alone, thus allowing itself to be easily vaporized and dried by hot air below 60° C.

Such a dewatering cleaning agent may consist substantially of the low molecular weight polyorganosiloxane and with it a satisfactory effect can be obtained. However, its cleaning and dewatering properties and the like will be further improved by forming it into a composition having the low molecular weight polyorganosiloxane mixed with a surfactant and/or a hydrophilic solvent.

The above-mentioned surfactants contribute to improving particularly the cleaning and dewatering property, and suitable surfactants to be applied to the invention include: anionic surfactants such as polyoxyalkylene alkylether sulfonates and phosphoric esters; nonionic surfactants such as polyalcohol fatty acid esters, polyoxyalkylene fatty acid esters, and polyoxyalkylene alkylethers; amphoteric surfactants such as imidazolin derivatives; and cationic surfactants such as alkylamine salts, alkyl quaternary ammonium salts. In addition thereto, terpene containing compounds which are rarely present in the form of a single substance and extracted from natural substances as well as higher fatty acid esters may also be applied. It is also possible to use synthetic compounds in which part of the chemical structure of each compound is substituted by a fluorine or silicon atom. However, it is more preferable to use nonionic surfactants if the effect as a dewatering cleaning agent used in combination with the low molecular weight polyorganosiloxane is to be further improved.

While the composition ratio of the surfactant is not particularly limited, it is desirable to have 20 parts by weight or less, or, more preferably, 3 parts by weight or less, of the surfactant to 100 parts by weight of low molecular weight polyorganosiloxane.

A suitable hydrophilic solvent may be one compatible with the low molecular weight polyorganosiloxanes, and more particularly, one whose flash point is 40° C. or more from the practical viewpoint. The hydrophilic solvent contributes to improving substituting property by water.

Suitable hydrophilic solvents include: polyalcohols and their derivatives such as ethylene glycol monomethyl ethers, ethylene glycol monoethyl ethers, ethylene glycol monopropyl ethers, ethylene glycol monobutyl ethers, ethylene glycol monobutyl ether acetates, diethylene glycol monobutyl ethers. Particularly preferable are diethylene glycol monobutyl ethers from the viewpoint of its compatibility with the low molecular weight polyorganosiloxanes and safety to the human body and the like. Since these compounds exhibit improved properties when coexisting with the low molecular weight polyorganosiloxanes, a composition only using this combination may allow substitution by water and drying.

While the composition ratio of the hydrophilic solvent is not particularly limited, it is preferable to have 100 parts by weight or less or, more preferably, 50 parts by weight or less of the hydrophilic solvent mixed with 100 parts by weight of the low molecular weight polyorganosiloxane.

The dewatering cleaning agents of the invention may be applied to metals, ceramics, plastics, and the like. More specifically, they may be applied to metallic parts, surface treated parts, electronic and semiconductor parts, electric and precision machinery parts, optical parts, glass and ceramic parts, and the like. An exemplary general-purpose cleaning process usually involves immersing of any of the above-described parts or spraying a dewatering cleaning agent of the invention onto the part to substitute it by water and drying by blowing hot air and the like. The immersing and spraying processes may be accompanied by an ultrasonic process and mechanical stirring.

The dewatering cleaning agents of the invention, exhibiting a powerful dewatering property, can not only provide cleaning and water-substituting effects equivalent to those of conventional cleaning agents containing flon and the like but also allow various materials to be stably cleaned with their low eroding action. In addition, containing no element halogen such as chlorine and bromine in general, the dewatering cleaning agents of the invention have few risk of destroying or polluting the environment. Thus, it can be said that the dewatering cleaning agents of the invention will be a viable replacement for the conventional organic solvent containing dewatering cleaning agents such as flon, which have been imposing the environmental problems.

BRIEF DESCRIPTION OF THE DRAWINGS

FIG. 1 is a diagram showing an exemplary construction of a cleaning system using a dewatering cleaning agent of the invention.

DETAILED DESCRIPTION OF THE PREFERRED EMBODIMENTS

The invention will now be described with reference to examples in which a cleaning composition of the invention is applied to water system cleaning agents.

Example 1

Two kinds (A1 and A2) of polyoxyalkylene group containing polyorganosiloxane, each represented by formula (V) and (VI), were prepared.

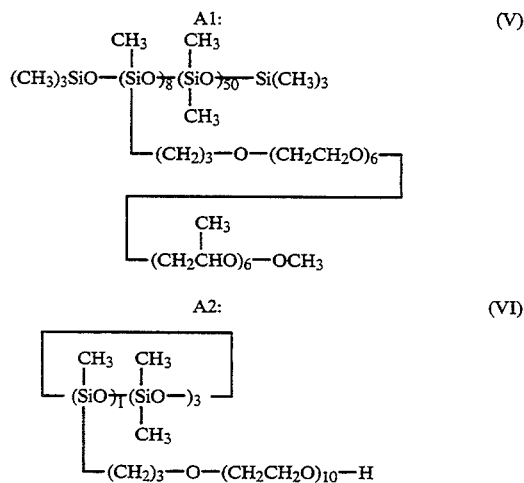

Then, the polyoxyalkylene denatured silicone (A1) represented by formula (V), polyoxyalkylene denatured silicone (A2) represented by formula (VI), sodium laurate (B1) and polyoxyethylene octylphenyl ether (B2) (20 moles of polyoxyethylene), both serving as surfactants, and water were weighed so that their ratio by weight will be 5:5:4:4:82. Thereafter, these components were charged into a homogenizing mixer for blending to obtain a water system cleaning composition P1.

Example 2

The polyoxyalkylene group containing polyorganosiloxane (A1), the sodium laurate (B1) and poly- oxyethylene octylphenyl ether (B2), both serving as surfactants, and water were weighed so that they satisfy the composition ratio specified in Table 1. Then, a water system cleaning composition P2 was obtained as in Example 1.

Examples 3 to 5

The polyoxyalkylene group containing polyorganosiloxanes (A1) and (A2), dioctyl sodium sulfosuccinate (B3) that serves as a surfactant in addition to the surfactants (B1) and (B2), octamethyl tetrasiloxane (D1) and octamethyl trisiloxane (D2), both as low molecular weight polyorganosiloxanes, and water were selectively mixed to prepare water system cleaning compositions P3 to P5 having composition ratios specified in Table 1 in the same manner as that in Example 1.

Comparative examples 1 to 3

Three kinds of water system cleaning compositions were prepared in a manner similar to that of each of the above examples except that no polyoxyalkylene group containing polyorganosiloxane was mixed.

The properties as a cleaning agent were evaluated as to the water system cleaning compositions of Examples 1 to 5 and Comparative examples 1 to 3 by the following methods. The result is also shown in Table 1.

(1) Penetration test

Measurements were made based on the JIS-specified canvas method. The smaller value means better penetrating property; i.e., the composition is more effective in cleaning smaller parts.

(2) Cleaning property test

A sample is prepared by applying a spindle oil over a steel strip and baking it at 135° C. for 48 hours. The property is evaluated by the time spent for cleaning the oil baked on the sample (by ultrasonic cleaning). The smaller the value is, the better the cleaning property becomes.

(3) Stability test

Each composition was contained in a transparent bottle of 200 ml sealed thereafter and then heated at 50° C. for 6 hours. After being gradually cooled from 50° to 25° C., its appearance in the bottle is observed.

TABLE 1

| | | Examples | | | | | Comparative examples | | |
|---|---|---|---|---|---|---|---|---|---|
| | | 1 | 2 | 3 | 4 | 5 | 1 | 2 | 3 |
| Composition ratio (wt. %) | | | | | | | | | |
| Polyoxyalkylene | A1 | 5 | 0.5 | 1.0 | — | 10 | — | — | — |
| Denatured silicone | A2 | 5 | — | — | 1.0 | — | — | — | — |
| Surfactant | B1 | 4 | 0.8 | 0.3 | 0.3 | 4 | 1.2 | 0.8 | 0.8 |
| | B2 | 4 | 0.7 | 0.4 | 0.5 | — | 0.8 | 0.7 | 0.7 |
| | B3 | — | — | — | 0.5 | — | 0.5 | — | — |
| Water | | 82 | 98 | 98 | 98 | 82 | 98 | 98 | 98 |
| Low molecular weight polyorganosiloxane | D1 | — | — | — | 0.2 | 3.5 | — | — | 0.5 |
| | D2 | — | — | 0.3 | — | — | — | — | — |
| Evaluation result | | | | | | | | | |
| Penetrability (Canvas method, in second) | | 7 | 8 | 4 | 3 | 2 | 25 | 22 | 18 |
| Cleaning property (in minute) | | 14 | 14 | 12 | 11 | 7 | 22 | 23 | 17 |
| Stability | | ST | ST | ST | ST | ST | ST | ST | SEP |

Note:
ST: stable
SEP: separated

As is apparent from the result shown in Table 1, the water system cleaning agent of the invention exhibits excellent cleaning capability and penetrability, attesting to its availability as a replacement for the conventional solvent based cleaning agents containing flon and the like. With its stability, it is considered a highly practical product. In contradistinction thereto, the water system cleaning agents according to Comparative examples were satisfactory neither in cleaning capability nor in penetrability.

An exemplary process employed to clean a specific part using a water system cleaning agent of the invention will now be described.

Example 6

In fabricating a liquid crystal device, a liquid crystal cell is evacuated to a high vacuum degree and a liquid crystal material is sealed in a device. In this case, the evacuation is carried out by a high performance diffusion vacuum pump. Since the diffused oil enters into the vacuum system in the form of mist, the pump must be cleaned often to remove the oil.

In this example, the water system cleaning agent of the invention was used in lieu of a conventional triethane cleaning agent.

A pump part made of a stainless steel SUS304 and a Ni-plated stainless steel SUS304 material having an adhesion of Silicon Oil F-4 (trademark of Shinetsu Chemical) as a diffusion oil was cleaned.

The composition ratio of the used water system cleaning agent is as shown below.

That is, in 80 wt. % of ion-exchanged water being sufficiently stirred at ambient temperature, 6 wt. % of the polyoxyalkylene group containing polyorganosiloxane having the following chemical structure was gradually added to obtain an achromatic translucent homogenous solution.

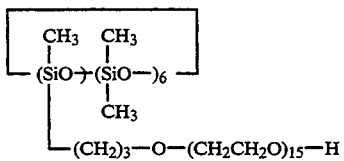

On the other hand, as a surfactant, a mixture of 8 wt. % of special nonionic Adecanol B-4001 (trademark of Asahi Electrochemical) and 6 wt. % of anionic TWA-2023 (trademark of Ipposha Oil and Grease) of sulfuric acid ester PURLONIC structure was added to the above water/siloxane solution.

After diluting the water system cleaning agent thus obtained was diluted by ion-exchanged water at an arbitrary ratio, Silicone Oil F-4 was cleaned using the diluted cleaning agents. As a result, the pump part was satisfactorily cleaned: through immersion by stirring for 1 minute in a 1/10 diluted cleaning agent at ambient temperature; through immersion by oscillating for 1 minute in a 1/30 diluted cleaning agent at 40° C. or through 1 minute ultrasonic cleaning at 20° C. in the same cleaning agent; and through 1 minute ultrasonic cleaning in a 1/50 diluted cleaning agent at 50° C., respectively.

For comparison, the pump part was similarly cleaned with compositions containing only surfactant(s) and no polyoxyalkylene group containing polyorganosiloxane. Silicone Oil was not removed sufficiently with 10 or more minute immersion ultrasonic cleaning in a 1/10 diluted composition at ambient temperature. To remove Silicone Oil with this composition, it took more than 5 minutes at 65° C. or more.

It is understood from this data that the cleaning agent that incorporates the polyoxyalkylene group containing polyorganosiloxane of the invention exhibits an outstanding cleaning property.

Example 7

The polyoxyalkylene group containing polyorganosiloxanes and the low molecular weight polyorganosiloxanes of the invention contribute to significantly improve the cleaning capability of commercially available water-soluble cleaning agents.

An aqueous solution of Chemiclean MS-109 (trademark of Sanyo Kasei Kogyo), which is a surfactant containing, low foaming, rust preventive cleaning agent, is typically used to clean mechanical and metallic parts. Blending 3 wt. % of the polyoxyalkylene denatured silicon (A1) represented by formula (V) in Example 1, 5 wt. % of cyclic hexamethylcyclotrisiloxane, 17 wt. % of ion-exchanged water with 65 wt. % of the above aqueous solution, a new cleaning composition was prepared.

This new cleaning composition was 1/20 diluted by ion-exchanged water and its cleaning property was evaluated by the following method. The result is shown in Table 2. For comparison, the evaluation result of 1/20 diluted Chemiclean MS-109 was also shown.

Test Method (1) Cleaning test—1

The following contaminants were applied to a degreased aluminum plate (AC-4A) by immersing, dried by blowing, and immersed while stirred (400 rpm) in respective cleaning agents (1/20 diluted) for 15 seconds to 1 minute. Then, after immersed in water, the aluminum plate was dried by blowing. Each contaminant was transferred on white paper through an adhesive tape for reflectance measurement by a colorimeter thereby to calculate the cleaning rate.

Contaminant:

| | |
|---|---|
| Spindle oil | 78% |
| Fatty acid ester | 15% |
| Chlorinated paraffin | 5% |
| Carbon black | 2% |

Cleaning rate (%) = $Rw - Rs/Ro - Rs$

Ro: Reflectance of the original white paper
Rs: Reflectance of the standard contaminated plate
Rw: Reflectance of the contaminated plate after cleaned (2) Cleaning test—2

A contaminant was prepared by adding 2% of carbon black to a water-soluble machining oil (emulsive), and the test was performed in a manner similar to that of Cleaning test—1. Its cleaning rate was similarly calculated.

TABLE 2

| | Immersion time (second) | Cleaning rate (%) | |
|---|---|---|---|
| | | Invention | MS-109 |
| Cleaning test - 1 | 15 | 72.4 | 59.0 |
| | 30 | 86.5 | 65.2 |

TABLE 2-continued

| | Immersion time (second) | Cleaning rate (%) | |
|---|---|---|---|
| | | Invention | MS-109 |
| Cleaning test - 2 | 60 | 100.0 | 67.8 |
| | 15 | 81.7 | 58.0 |
| | 30 | 93.8 | 71.0 |

Similar tests were conducted on EP-680 (trademark of E.P. Japan) which is a commercially available supereffective cleaning solution and water system cleaning agent; Banrise D-20 (trademark of Joban Chemical Industries) which is an emulsive degreased cleaning agent; and Hikari Ace (trademark of Shoko Trade) which is a powerful special cleaning agent. As a result, these cleaning agents, when used in combination of the polyoxyalkylene group containing polyorganosiloxane and the low molecular weight polyorganosiloxane of the invention, exhibited a significantly improved cleaning property.

Example 8

The water system cleaning agent of the invention exhibits remarkable effect on cleaning of fluxes used in mounting electronic parts on printed boards. The flux comes roughly in two types: rosin containing and water-soluble. A specific example of cleaning rosin containing fluxes, which is said to be a difficult task, will now be described.

As a step prior to soldering a part on a printed board, a WW rosin ester was put on a part and immersed in a solder bath at 230° to 250° C. and then the part was mounted. It was observed that the flux was completely removed when the printed board was shower-rinsed for 35° C. for 45 seconds using a water system cleaning agent described below.

The water system cleaning composition used here is prepared by blending 2 wt. % of the polyoxyalkylene group containing polyorganosiloxane represented by formula (VII), 3 wt. % of Senkanol FM (trademark of Nippon Senka), which is an amphoteric surfactant, 5 wt. % of Nikkol CMT-30 (trademark of Nippon Surfactant), which is a sodium-N-COCOIL methyl taurine containing nonionic surfactant, and adding ion-exchanged water to prepare 100 wt. % of the composition.

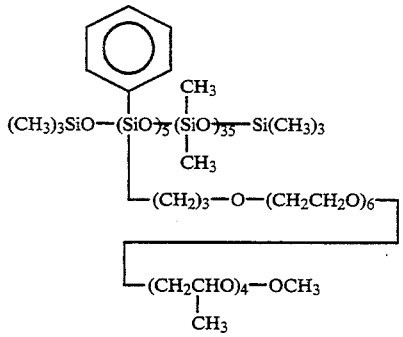

(VII)

When acceleration aging tests which guarantees US MIL-F-14256C standard, surface insulation resistance tests, ion residual tests and the like were conducted on the above composition which was 1/10 diluted by ion-exchanged water, the results were satisfactory.

Examples in which cleaning compositions of the invention were applied to dewatering cleaning agents will now be described.

Examples 9 to 17

Octamethyltrisiloxane (E1), octamethylcyclotetrasiloxane (E2), and decamethylcyclopentasiloxane (E3) were prepared as low molecular weight polyorganosiloxanes; polyoxyethylene oleyl ether (F1) (P.O.E =6 moles), and polyoxyethylene octylphenyl ether (F2) (P.O.E =10 moles) as surfactants; and diethylene glycol monobutyl ether (G1) as a hydrophilic solvent were prepared.

These components were selected and blended so that the composition ratio shown in Table 3 were satisfied to obtain respective dewatering cleaning agents.

Comparative examples 4 to 8

Flon 113, methylene chloride, isopropyl alcohol, and ethanol were prepared as conventional dewatering cleaning agents to obtain 5 types of dewatering cleaning agents whose composition ratios were as shown in Table 3.

The properties of Examples 9 to 17 and Comparative examples 4 to 8 were evaluated by the following methods. The result is also shown in Table 3.

(1) Dewatering property

Various pieces (a stainless steel strip, a ceramic piece, a polycarbonate piece, a Ni-plated steel strip) were immersed in each dewatering cleaning agent after washed by water. In examples 13 to 15, each piece was then rinsed by the low molecular weight polyorganosiloxane blended to prepare each dewatering cleaning agent. Thereafter, each piece was dried in an oven at 50° C. The water marks (a stain by impurities dissolved in water) after drying each piece was observed visibly and by a scanning electron microscope and evaluated in accordance with the following criteria.

XX: Not evaluable due to erosion of the piece during dewatering.
X: Water marks were visibly observed.
○: No water marks were visibly observed.
ⓞ: No water marks whose size is 50 μm or more were observed by the scanning electron microscope.

(2) Continuous dewatering property

A continuous dewatering test with a frequency of 50 times were conducted on a stainless steel strip and the appearance of the strip was evaluated in a manner similar to that of item (1).

(3) Drying property

The stainless steel strip was immersed in each dewatering cleaning agent and dried in the oven at 50° C. During the drying process, the strip was touched by a finger to see the drying condition every 5 minutes and the time required for drying was recorded on a 5-minute basis.

TABLE 3

| | Examples | | | | | | | | | Comparative examples | | | | |
|---|---|---|---|---|---|---|---|---|---|---|---|---|---|---|
| | 9 | 10 | 11 | 12 | 13 | 14 | 15 | 16 | 17 | 4 | 5 | 6 | 7 | 8 |
| Composition ratio | | | | | | | | | | | | | | |

TABLE 3-continued

|  |  | Examples | | | | | | | | | Comparative examples | | | | |
|---|---|---|---|---|---|---|---|---|---|---|---|---|---|---|---|
|  |  | 9 | 10 | 11 | 12 | 13 | 14 | 15 | 16 | 17 | 4 | 5 | 6 | 7 | 8 |
| (Parts by weight) | | | | | | | | | | | | | | | |
| Low molecular weight | E1 | 100 | — | — | 50 | 100 | — | — | — | — | — | — | — | — | — |
| polyorganosiloxane | E2 | — | 100 | 50 | 50 | — | 100 | 100 | 100 | — | 50 | — | — | — | — |
|  | E3 | — | — | 50 | — | — | — | — | — | 100 | — | — | — | — | — |
| Surfactant | F1 | — | — | — | — | 0.3 | 0.3 | — | — | — | — | — | — | — | — |
|  | F2 | — | — | — | — | — | — | 0.2 | — | — | — | — | — | — | — |
| Hydrophilic solvent | C1 | — | — | — | — | — | — | — | 10 | 20 | — | — | — | — | — |
| Methylene chloride | | — | — | — | — | — | — | — | — | — | 50 | 100 | — | — | — |
| Freon | 113 | — | — | — | — | — | — | — | — | — | — | — | 100 | 96 | — |
| Ethanol | | — | — | — | — | — | — | — | — | — | — | — | — | 4 | — |
| Isopropyl alcohol | | — | — | — | — | — | — | — | — | — | — | — | — | — | 100 |
| Dewatering property | | | | | | | | | | | | | | | |
| Stainless steel | | ◎ | ◎ | ◎ | ◎ | ◎ | ◎ | ◎ | ◎ | ◎ | ○ | ○ | ◎ | ◎ | ◎ |
| Ceramics | | ○ | ○ | ○ | ○ | ◎ | ◎ | ◎ | ◎ | ◎ | X | X | ○ | ○ | ◎ |
| Polycarbonate | | ◎ | ◎ | ◎ | ◎ | ◎ | ◎ | ◎ | ◎ | ◎ | XX | XX | ◎ | ◎ | XX* |
| Ni plated strip | | ◎ | ◎ | ◎ | ◎ | ◎ | ◎ | ◎ | ◎ | ◎ | XX | XX | ◎ | ◎ | ◎ |
| Continuous dewatering property | | ◎ | ◎ | ◎ | ◎ | ◎ | ◎ | ◎ | ◎ | ◎ | ○ | ○ | ◎ | ◎ | ◎ |
| Drying property (50° C. in oven in minute) | | 10 | 5 | 10 | 10 | 10 | 5 | 5 | 10 | 15 | 5 | 5 | <5 | <5 | <5 |

Note:
*Solvent cracks occurred.

As is apparent from the result shown in Table 3, the dewatering cleaning agents of the invention, exhibiting satisfactory dewatering property, can be a viable substitute for organic solvent containing flon and the like based cleaning agents.

Dewatering cleaning agents containing methylene chloride or isopropyl alcohol (Comparative examples 4 and 5) rust and erode metal films and plastics. In contradistinction thereto, the dewatering cleaning agents of the invention are stable to metal films and plastics and exhibit satisfactory dewatering property even to ceramics which have large surface roughness values, thereby ensuring their reliability when applied to parts including metal, plated, electronic, semiconductor, plastic, and ceramic parts. The dewatering cleaning agent containing isopropyl alcohol permitted water to be dissolved therein, thereby causing water to present on the part again.

Moreover, it is understood that mixing of surfactants and hydrophilic solvents with the dewatering cleaning agents of the invention improved the dewatering property, thereby attesting to their industrial applicability.

An exemplary cleaning system using a dewatering cleaning agent of the invention will now be described with reference to FIG. 1.

A cleaning system shown in FIG. 1 consists roughly of a cleaning/water-substituting process A and a rinsing/dewatering process B.

The cleaning/water-substituting process A, which is the first process involves a first cleaning vessel 1 and a second cleaning vessel 2, each serving both as a separator through sedimentation and a separator through overflow, and a dewatering vessel 3. The first and second cleaning vessels 1 and 2 communicate with each other through a drain line 2a and an overflow line 2b. The first and second cleaning vessels 1 and 2 are operated together with ultrasonic, oscillating, mechanical stirring, cleaning agent heating, and brushing processes and the like, if necessary.

The first and second cleaning vessels 1 and 2 respectively contain a cleaning agent D1 composed of a low molecular weight polyorganosiloxane and a surfactant, which is one of the dewatering cleaning agents of the invention. The surfactant containing cleaning agent D1 may be so prepared that its specific gravity is smaller than that of water and larger than that of an oily stain. Therefore, water Y introduced by an object to be cleaned X is separated by being sedimentated at the bottom of the surfactant containing cleaning agent D1 that has been charged in the first and second cleaning vessels 1 and 2. If an oily stain Z is present on the object X, the oily stain Z is separated by floating upward in the surfactant containing cleaning agent D1 in the first and second cleaning vessels 1 and 2.

The water Y separated by being sedimentated in the second cleaning vessel 2 is intermittently discharged to the first cleaning vessel 1 through a drain line 2a while the water Y separated by being sedimentated in the first cleaning vessel 1 is intermittently discharged to a cleaning agent recycling mechanism C (described later) through a drain line 4. A drain line 3a connected to the drainage vessel 3 is also connected to the cleaning agent recycling mechanism C.

The oily stain Z separated by floating in the first and second vessels 1 and 2 is discharged outside while continuously overflown through an overflow line 5 connected to the first cleaning vessel 1.

The surfactant containing cleaning agent D1 charged in the first and second cleaning vessels 1 and 2 is continuously circulated through a filter 6 that serves to remove solid particles, H2O particles, undissolved substances, and the like contained in the cleaning agent D1.

The rinsing/dewatering process B, which is the second process, involves a third cleaning vessel 7 and a shower rinse vessel 8. Below the shower rinse vessel 8 is a buffer tank 9 that communicates with the third cleaning vessel 7 through a drain line 9a and an overflow line 9b. The third cleaning vessel 7 is also operated together with ultrasonic, oscillating, mechanical stirring, cleaning agent heating, and brushing processes and the like, if necessary.

The third cleaning vessel 7 contains a cleaning agent D2 consisting only of a silicone composition identical to the low molecular weight polyorganosiloxane used in the first process A. The cleaning agent D2 may be so prepared that its specific gravity is smaller than that of water and larger than that of an oily stain. Therefore, as in the first process A, water Y is separated by being sedimentated at the bottom of the cleaning agent D2 and the oily stain Z is separated by floating upward in the cleaning agent D2.

The water Y separated by being sedimentated in the third cleaning vessel 7 is intermittently discharged to the cleaning agent recycling mechanism C through a drain line 10 while the oily stain Z separated by floating in the third cleaning vessel 7 is discharged outside through an overflow line 11.

The cleaning agent D2 charged in the third cleaning vessel 7 is continuously circulated through a filter 12 that serves to remove solid particles, $H_2O$ particles, undissolved substances, and the like contained in the cleaning agent D2.

The object to be cleaned X undergoes the first process A and then the second process B, cleaned and dewatered, and then dried by a fan forced drier (not shown) to complete the cleaning process.

The cleaning agent used in the cleaning system is subjected to the following recycling process.

As described above, the drain lines 4, 3a, 10 of the first, second, and third cleaning vessels 1, 2, and 7, and the dewatering vessel 3 are connected to the cleaning agent recycling mechanism C. The cleaning agent D1 or D2 contained in each cleaning vessel is constantly cleaned by the filters 6 and 12. However, when heavily contaminated, the cleaning agent is introduced to the cleaning agent recycling mechanism C through drain lines 4 and 10 by a conveyer pump 13 for fractional distillation. The cleaning agent D1 deposited in the dewatering vessel 3 is also supplied intermittently to the cleaning agent recycling mechanism C.

At the cleaning agent recycling mechanism C, the introduced cleaning agent is separated into liquid components and solid components by a filter 14, and only the liquid components are forwarded to a distiller 15 with the solid components being destroyed. The distiller 15 separates various components, water, oily stains in the cleaning agent utilizing the difference in their boiling points. Water and the like that remain in the distiller 15 are further separated by a decanter 16.

Since the cleaning agent D1 is an agent having a surfactant added to the cleaning agent D2 that contains only the low molecular weight polyorganosiloxane, the low molecular weight polyorganosiloxane, i.e., the cleaning agent D2, can be extracted from both cleaning agents D1 and D2, thereby allowing the cleaning agent D2 to be recycled. The components other than the recycled cleaning agent D2, i.e., the surfactant, water, and the like will be destroyed.

The recycled cleaning agent D2 is forwarded to a mixer 18 from which the cleaning agent D1 is supplied to the shower rinse vessel 8, the third cleaning vessel 7, or the second cleaning vessel 2 through a line 17.

In the shower rinse vessel 8, a shower rinsing process is conducted using only the recycled cleaning agent D2 or a cleaning agent D2 newly introduced through a cleaning agent supply line 19, both being free from impurities.

The mixer 18 mixes the recycled or new cleaning agent D2 with the surfactant newly supplied from a surfactant supply line 20 to prepare a new cleaning agent D1. The new cleaning agent D1 is supplied to the second cleaning vessel 2, if necessary.

With the cleaning system of such construction as described above, the dewatering cleaning agents of the invention can be used efficiently and effectively enjoying the advantage of excellent cleaning properties.

Industrial Applicability

As described in the foregoing pages, the cleaning compositions of the invention, when used as water system cleaning agents, exhibit a cleaning effect equivalent to that of conventional flon containing cleaning agents and an excellent stability as a water system with no risk of enviromental destruction and pollution, thereby making a viable replacement for the organic solvent based cleaning agents including flon and the like which have environmental disadvantages. In addition, the cleaning compositions of the invention, when used as dewatering cleaning agents, provide a powerful dewatering property with no risk of environmental destruction and pollution, thereby serving a viable replacement for the organic solvent based dewatering cleaning agents including flon and the like which have environmental disadvantages.

What is claimed is:

1. A method for cleaning and dewatering metal parts, glass parts, ceramic parts, or plastic parts having a hard surface, comprising the step of:

(a) washing a part with an aqueous composition whereby water remains on the part, (b) treating the part which contains water on its surface with a cleaning composition consisting essentially of (i) at least one polyorganosiloxane not-compatible with water selected from the group consisting of a straight chain polyorganosiloxane represented by the formula:

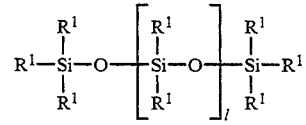

and a cyclic polyorganosiloxane represented by the formula:

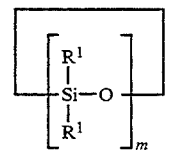

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, and (ii) at least one of a surfactant and hydrophilic solvent wherein the cleaning composition is substantially free of water, whereby water is removed from the surface of the part and residual cleaning composition remains on the part, and (c) removing residual cleaning composition by treatment with a rinsing agent comprising the same or different said straight-chain polyorganosiloxane or said cyclic polyorganosiloxane used in step (b), and (d) drying said part to completely remove said rinsing agent from the part.

2. A method according to claim 1, wherein the part comprises a metallic part.

3. A method according to claim 1, wherein the part comprises a surface-treated part.

4. A method according to claim 1, wherein the part comprises an electronic part.

5. A method according to claim 1, wherein the part comprises a semiconductor part.

6. A method according to claim 1, wherein the part comprises a precision machinery part.

7. A method according to claim 1, wherein the part comprises an optical part.

8. A method according to claim 1, wherein the part comprises a glass part.

9. A method according to claim 1, wherein the part comprises a ceramic part.

10. A method according to claim 1, wherein the part comprises a plastic part having a hard surface.

11. A method according to claim 1, wherein the cleaning composition consists essentially of one or more of the cyclic polyorganosiloxanes.

12. A method according to claim 1, wherein the method further comprises the use of an ultrasonic process.

13. A method according to claim 1, wherein said drying comprises heating the part to a temperature of 60° C. or less.

14. A method according to claim 1, wherein said drying comprises exposing the part to air.

15. A method according to claim 1, wherein said drying comprises exposing the part to heated air.

16. A method according to claim 1, wherein said drying comprises drying in a heated oven.

17. A method according to claim 1, wherein the treating of step (b) takes place in a vessel which contains the cleaning composition, and wherein said rinsing comprises use of a rinsing agent which consists essentially of the polyorganosiloxanes used in the cleaning step.

18. A method for cleaning and dewatering an object comprising the steps of:
 (a) a cleaning step comprising dewatering and cleaning an object to be cleaned containing water on its surface in a cleaning vessel containing a dewatering polyorganosiloxane cleaning agent, and
 (b) a rinsing step comprising rinsing and cleaning said object after the dewatering and cleaning by use of a plurality of rinsing cleaning vessels in sequence, each of the rinsing cleaning vessels containing a polyorganosiloxane rinsing cleaning agent, the rinsing cleaning vessels being connected with each other such that said rinsing cleaning agent is transmitted in sequence in the direction opposite to that in which the object is transmitted,
 wherein said rinsing step is conducted while a rinsing cleaning waste liquid is recovered from the most downstream rinsing cleaning vessel of said plurality of rinsing cleaning vessels,
 wherein the recovered rinsing cleaning waste liquid is distilled to recover polyorganosiloxanes, and
 wherein the recovered polyorganosiloxanes are re-supplied to the one or more of the rinsing cleaning vessel, and
 (c) drying said part to completely remove said rinsing agent from the part.

19. A method for cleaning and removing water from metal parts, glass parts, ceramic parts, or plastic parts having a hard surface, comprising the step of removing water from a part which contains water on its surface by treatment with a cleaning composition consisting essentially of one or more of a surfactant or hydrophilic solvent and at least one polyorganosiloxane not-compatible with water selected from the group consisting of a straight chain polyorganosiloxane represented by the formula:

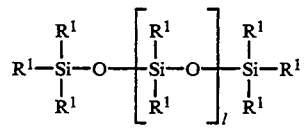

wherein l is an integer from 0 to 5, and a cyclic polyorganosiloxane represented by the formula:

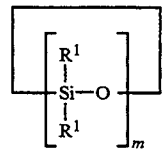

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7; wherein the cleaning composition is substantially free of water, and completely drying the part to remove the cleaning composition.

20. A method according to claim 19, wherein after the cleaning step, the part is rinsed with a rinsing composition.

21. A method according to claim 20, wherein the rinsing composition comprises a polyorganosiloxane.

22. A continuous method for cleaning and removing water from an object comprising the steps of:
 (a) cleaning the object and removing water from the object by use of a cleaning composition consisting essentially of at least one polyorganosiloxane not-compatible with water selected from the group consisting of a straight chain polyorganosiloxane represented by the formula:

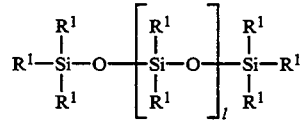

wherein l is an integer from 0 to 5, and a cyclic polyorganosiloxane represented by the formula:

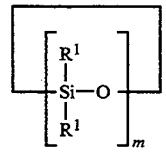

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, wherein the cleaning composition is substantially free of water, and (b) recovering the polyorganosiloxane of the cleaning composition and recycling it back into the method, and completely drying the part to remove the cleaning composition.

23. A method for removing water from industrial parts comprising the steps of treating a part having water on its surface with a composition to remove water on the parts surface, wherein the composition consists essentially of at least one polyorganosiloxane not-compatible with water selected from the group consisting of a straight chain polyorganosiloxane represented by the formula:

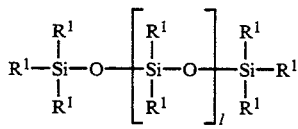

wherein l is an integer from 0 to 5, and
a cyclic polyorganosiloxane represented by the formula:

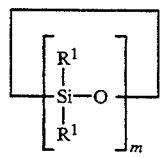

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, wherein the cleaning composition is substantially free of water, and completely drying the part to remove the composition.

24. A method for deliquifying and cleaning an object comprising the steps of:

(a) treating the object with an aqueous cleaning agent such that residual water remains on the object, and (b) then removing this water by treating the object with a composition consisting essentially of at least one polyorganosiloxane not-compatible with water selected from the group consisting of a straight chain polyorganosiloxane represented by the formula:

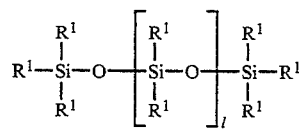

wherein l is an integer from 0 to 5, and
a cyclic polyorganosiloxane represented by the formula:

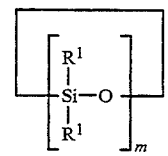

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, wherein the cleaning composition is substantially free of water, and completely drying the part to remove the composition.

25. A method for cleaning and removing water from an object comprising the steps of:

subjecting the object to be cleaned to an ultrasonic treatment and washing the part to clean the part and remove water from the part, with a cleaning composition consisting essentially at least one polyorganosiloxane not-compatible with water selected from the group consisting of a straight chain polyorganosiloxane represented by the formula:

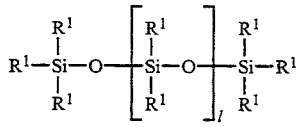

wherein l is an integer from 0 to 5, and
a cyclic polyorganosiloxane represented by the formula:

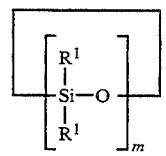

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, wherein the cleaning composition is substantially free of water, and completely drying the part to remove the composition.

* * * * *

UNITED STATES PATENT AND TRADEMARK OFFICE
CERTIFICATE OF CORRECTION

PATENT NO. : 5,443,747                              Page 1 of 2
DATED      : Aug. 22, 1995
INVENTOR(S): INADA et al.

It is certified that error appears in the above-indentified patent and that said Letters Patent is hereby corrected as shown below:

Title page, item [86], "PCt/JP90/01372" should read --PCT/JP90/01372--.

Column 2, line 17, "molucular" should read --molecule--;
         line 41, "using" should read --use--.

Column 4, line 52, "oxyalkyelene" should read --oxyalkylene--.

Column 6, lines 17-18, "penetratbility" should read --penatrability--;
         line 27, "part" should read --parts--.

Column 7, line 47, "have considered" should read --have been considered--.

Column 9, line 13, "few" should read --a small--.

Column 13, line 62, "guarantees" should read --guarantee--.

UNITED STATES PATENT AND TRADEMARK OFFICE
CERTIFICATE OF CORRECTION

PATENT NO.  : 5,443,747
DATED       : Aug. 22, 1995
INVENTOR(S) : INADA et al.

It is certified that error appears in the above-indentified patent and that said Letters Patent is hereby corrected as shown below:

Column 14, line 18, "ratio" should read --ratios--.

Column 15, in the chart, "Freon       113" should read --Freon 113--.

Column 18, line 18, "step" should read --steps--.

Signed and Sealed this

Nineteenth Day of March, 1996

Attest:

BRUCE LEHMAN

Attesting Officer

Commissioner of Patents and Trademarks

REEXAMINATION CERTIFICATE (3196th)

United States Patent [19]

Inada et al.

[11] B1 5,443,747

[45] Certificate Issued    May 13, 1997

[54] CLEANING COMPOSITIONS

[75] Inventors: Minoru Inada, Yokohama; Kimiaki Kabuki, Tokyo; Yasutaka Imajo, Hachioji; Takayuki Oguni; Noriaki Yagi, both of Yokohama; Nobuhiro Saitoh, Ota; Akitsugu Kurita, Ota; Yoshiaki Takezawa, Ota, all of Japan

[73] Assignee: Kabushiki Kaisha Toshiba, Kawasaki, Japan

Reexamination Request:
No. 90/004,202, Apr. 2, 1996

Reexamination Certificate for:
Patent No.: 5,443,747
Issued: Aug. 22, 1995
Appl. No.: 651,370
Filed: Feb. 28, 1991

Certificate of Correction issued Mar. 19, 1996.

[22] PCT Filed:    Oct. 25, 1990
[86] PCT No.:    PCT/JP90/01372
   § 371 Date:    Feb. 28, 1991
   § 102(e) Date:    Feb. 28, 1991
[87] PCT Pub. No.:    WO91/06621
   PCT Pub. Date: May 16, 1991

[30] Foreign Application Priority Data

| Oct. 26, 1989 | [JP] | Japan | 1-280860 |
| Nov. 21, 1989 | [JP] | Japan | 1-302580 |
| Mar. 16, 1990 | [JP] | Japan | 2-065841 |
| Mar. 16, 1990 | [JP] | Japan | 2-065842 |

[51] Int. Cl.$^6$ ................ B08B 3/12; B08B 7/04
[52] U.S. Cl. .......... 134/1; 134/42; 134/40; 510/161; 510/166; 510/175; 510/364; 510/466; 510/165; 510/167; 510/163; 510/244; 510/245; 510/254; 510/407; 510/179
[58] Field of Search ............ 252/94, 174.15; 134/40, 42, 1, 44; 510/161, 166, 175, 364, 466, 165, 177, 163, 244, 245, 407

[56] References Cited

U.S. PATENT DOCUMENTS

| 3,498,923 | 3/1970 | Zisman | 252/171 |
| 3,511,708 | 5/1970 | Zisman | 134/40 |
| 3,516,938 | 6/1970 | Zisman | 252/171 |
| 3,903,012 | 9/1975 | Brandreth | 252/194 |
| 4,290,896 | 9/1981 | Gordon | 210/710 |

OTHER PUBLICATIONS

Handbook of Surface Preparation, R.C. Snogren, (1974), pp. 111–112, 311, 423–425.
Perry's Chemical Engineers Handbook, 6th ed., (1984), pp. 20–25.
Encylopedia Chemical Technology, Kirk–Othmer, (1980), vol. 10, pp. 897–900.
Encyclopedia Chemical Technology, Kirk–Othmer, (1983), vol. 21, pp. 355–376.

*Primary Examiner*—Paul Lieberman

[57]    ABSTRACT

A cleaning composition comprising at least one low molecular weight polyorganosiloxane selected from the group consisting of straight chain polydiorganosiloxane represented by a general formula:

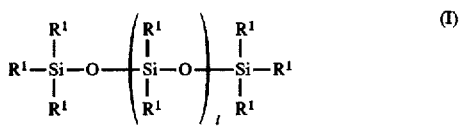

(wherein $R^1$ is an organic group of single valence substituted by the same or different group or unsubstituted, and l is an integer from 0 to 5), and cyclic polydiorganosiloxane represented by a general formula:

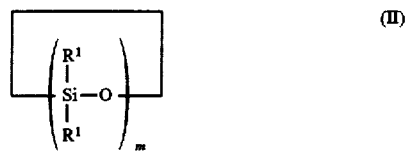

(wherein $R^1$ is an organic group of single valence substituted by the same or different group or unsubstituted, and m is an integer from 3 to 7). To use it as a water system cleaning agent, polyoxyalkylene group containing polyorganosiloxane, a surfactant, and water are additionally mixed. Accordingly, a cleaning effect free from environmental destruction and contamination, equivalent to flon containing cleaning agents, and satisfactorily stable in terms of dispersion as a water system cleaning agent can be obtained. In addition, to use as a dewatering cleaning agent, the low molecular weight polyorganosiloxane is additionally mixed alone or with a surfactant and/or a hydrophilic solvent. Accordingly, cleaning and water substituting properties equivalent to flon containing dewatering cleaning agents and environmental safety can be obtained.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21, 23, 25 is confirmed.

Claims 22 and 24 are determined to be patentable as amended.

New claims 26–45 are added and determined to be patentable.

22. A continuous method for cleaning and removing water from an [object] *industrial part* comprising the steps of:

(a) cleaning the [object] *part* and removing water from the [object] *part* by use of a cleaning composition consisting essentially of at least one polyorganosiloxane not-compatible with water selected from the group consisting of a straight chain polyorganosiloxane represented by the formula:

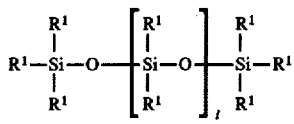

wherein 1 is an integer from 0 to 5, and a cyclic polyorganosiloxane represented by the formula:

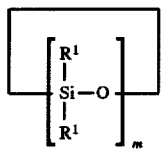

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, wherein the cleaning composition is substantially free of water, and (b) recovering the polyorganosiloxane of the cleaning composition and recycling it back into the method, and completely drying the part to remove the cleaning composition.

24. A method for deliquifying and cleaning an [object] *industrial part* comprising the steps of:

(a) treating the [object] *part* with an aqueous cleaning agent such that residual water remains on the [object] *part*, and (b) then removing this water by treating the [object] *part* with a composition consisting essentially of at least one polyorganosiloxane not-compatible with water selected from the group consisting of a straight chain polyorganosiloxane represented by the formula:

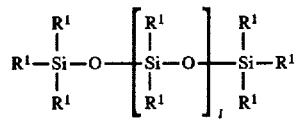

wherein 1 is an integer from 0 to 5, and a cyclic polyorganosiloxane represented by the formula:

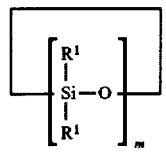

wherein $R^1$ in each of the above formulas is independently selected from the group consisting of methyl, ethyl, propyl, butyl, phenyl, trifluoromethyl, amino, amide, acrylic acid ester and mercaptan; l is an integer from 0 to 5; and m is an integer from 3 to 7, wherein the cleaning composition is substantially free of water, and completely drying the part to remove the composition.

26. A method according to claim 1, wherein said rinsing agent consists essentially of one or more of said straight-chain polyorganosiloxanes and said cyclic polyorganosiloxanes.

27. A method according to claim 21, wherein the rinsing composition consists essentially of one or more polyorganosiloxanes.

28. A method according to claim 1, wherein (ii) comprises said hydrophilic solvent.

29. A method according to claim 19, wherein said cleaning composition comprises said hydrophilic solvent.

30. A method according to claim 22, wherein after the cleaning step (a) and before the drying, the part is rinsed with a rinsing composition, whereby the drying of the part removes any cleaning composition or rinsing composition remaining on the part.

31. A method according to claim 23, wherein after said treating of the part and before the drying, the part is rinsed with a rinsing composition, whereby the drying of the part removes any cleaning composition or rinsing composition remaining on the part.

32. A method according to claim 24, wherein after the treating step (a) and before the drying, the part is rinsed with a rinsing composition, whereby the drying of the part removes any cleaning composition or rinsing composition remaining on the part.

33. A method according to claim 25, wherein after said washing of the part and before the drying, the part is rinsed with a rinsing composition, whereby the drying of the part removes any cleaning composition or rinsing composition remaining on the part.

34. A method according to claim 30, wherein said rinsing composition consists essentially of one or more of said straight-chain polyorganosiloxanes and said cyclic polyorganosiloxanes.

35. A method according to claim 31, wherein said rinsing composition consists essentially of one or more of said straight-chain polyorganosiloxanes and said cyclic polyorganosiloxanes.

36. A method according to claim 32, wherein said rinsing composition consists essentially of one or more of said straight-chain polyorganosiloxanes and said cyclic polyorganosiloxanes.

37. A method according to claim 33, wherein said rinsing composition consists essentially of one or more of said straight-chain polyorganosiloxanes and said cyclic polyorganosiloxanes.

38. A method according to claim 22, wherein the cleaning composition further consists essentially of one or more of a surfactant or hydrophilic solvent.

39. A method according to claim 23, wherein the composition further consists essentially of one or more of a surfactant or hydrophilic solvent.

40. A method according to claim 24, wherein the composition further consists essentially of one or more or a surfactant or hydrophilic solvent.

41. A method according to claim 25, wherein the cleaning composition further consists essentially of one or more of a surfactant or hydrophilic solvent.

42. A method according to claim 18, wherein said rinsing cleaning agent consists essentially of said polyorganosiloxane.

43. A method according to claim 18, wherein said cleaning agent contains one or more of a surfactant or hydrophilic solvent.

44. A method according to claim 1, wherein (ii) comprises a surfactant selected from the group consisting of polyoxyalkylene alkylether sulfonates, phosphoric esters, polyalcohol fatty acid esters, polyoxyalkylene fatty acid esters, polyoxyalkylene alkyl ethers, imidazolines, alkylamine salts, alkyl quaternary ammonium salts, terpene containing compounds, and higher fatty acid esters.

45. A method according to claim 1, wherein (ii) comprises a hydrophilic solvent selected from the group consisting of polyalcohols, ethylene glycol monomethyl ethers, ethylene glycol monoethyl ethers, ethylene glycol monopropyl ethers, ethylene glycol monobutyl ethers, ethylene glycol monobutyl ether acetates, and diethylene glycol monobutyl ethers.

* * * * *